(12) United States Patent
Wu et al.

(10) Patent No.: US 11,157,769 B2
(45) Date of Patent: Oct. 26, 2021

(54) IMAGE PROCESSING CIRCUIT AND ASSOCIATED IMAGE PROCESSING METHOD

(71) Applicant: Realtek Semiconductor Corp., HsinChu (TW)

(72) Inventors: Chun-Chang Wu, Taichung (TW); Shih-Tse Chen, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 32 days.

(21) Appl. No.: 16/407,200

(22) Filed: May 9, 2019

(65) Prior Publication Data
US 2020/0097761 A1    Mar. 26, 2020

(30) Foreign Application Priority Data

Sep. 25, 2018   (TW) .................................. 107133681

(51) Int. Cl.
*G06K 9/62* (2006.01)
(52) U.S. Cl.
CPC ........... *G06K 9/6232* (2013.01); *G06K 9/623* (2013.01)
(58) Field of Classification Search
CPC .. G06K 9/6232; G06K 9/623; G06K 9/00503; G06K 9/6202; G06N 3/02;
(Continued)

(56) References Cited

U.S. PATENT DOCUMENTS 4,720,871 A * 1/1988 Chambers ................. G06T 5/20
                                                  348/606
4,814,889 A * 3/1989 Covey ................ H04N 5/23212
                                                  348/351

(Continued)

FOREIGN PATENT DOCUMENTS

CN       204331828 U   *  5/2015
CN       107665491 A   *  2/2018
(Continued)

OTHER PUBLICATIONS

Computer Translation for CN 108062551 Jiang et al May 2018 (Year: 2018).*

(Continued)

*Primary Examiner* — Nancy Bitar
(74) *Attorney, Agent, or Firm* — Winston Hsu

(57) ABSTRACT

An image processing circuit includes a receiving circuit, a feature fetching module and a decision circuit. In the operations of the image processing circuit, the receiving circuit is configured to receive image data. The feature fetching module is configured to use a multi-topological-convolutional network to fetch the features of the image data, to generate a plurality of image features determined by the characteristics and weights of the convolution filter, where the image features may be smooth features or edge features. In the present invention, the convolution filters used by the feature fetching module are not limited by a square convention filter, and the convolution filters may include the multiple topological convolutional network having non-square convolution filters. By using the multiple topological convolutional network of the present invention, the feature fetching module can fetch the rich image features for identifying the contents of the image data.

5 Claims, 9 Drawing Sheets

(58) Field of Classification Search
CPC .... G06N 3/0056; G06T 5/00; G06T 7/60; G06F 17/153; G06F 17/156; G06F 17/15; G06F 17/10
USPC ............... 382/205, 156, 194, 221, 279, 286
See application file for complete search history.

(56) References Cited

U.S. PATENT DOCUMENTS

| | | | | |
|---|---|---|---|---|
| 5,019,708 | A * | 5/1991 | Flaum | G01V 5/12 250/264 |
| 5,241,372 | A * | 8/1993 | Ohba | H04N 5/2628 348/578 |
| 6,639,629 | B1 * | 10/2003 | Takayama | H04N 5/238 348/364 |
| 7,050,197 | B1 * | 5/2006 | Szumla | H04N 1/32561 358/1.15 |
| 8,762,443 | B1 * | 6/2014 | Kurtz | G06F 7/5443 708/520 |
| 9,552,549 | B1 * | 1/2017 | Gong | G06N 3/0454 |
| 9,875,529 | B2 * | 1/2018 | Lee | G06T 5/002 |
| 2004/0218235 | A1 * | 11/2004 | Kawano | H04N 1/40075 358/505 |
| 2006/0215929 | A1 * | 9/2006 | Fresneau | G06T 5/20 382/279 |
| 2007/0019881 | A1 * | 1/2007 | Curtis | G06T 5/008 382/274 |
| 2008/0068660 | A1 * | 3/2008 | Loce | H04N 1/40075 358/3.06 |
| 2008/0080746 | A1 * | 4/2008 | Payonk | G06K 9/00281 382/118 |
| 2008/0089449 | A1 * | 4/2008 | Lucidarme | H04L 27/2647 375/340 |
| 2010/0290700 | A1 * | 11/2010 | Yokono | G06K 9/6263 382/159 |
| 2010/0303310 | A1 * | 12/2010 | Chiu | G06K 9/0008 382/124 |
| 2013/0003911 | A1 * | 1/2013 | Schultz | H03M 1/60 377/54 |
| 2016/0189393 | A1 * | 6/2016 | Rao | G06K 9/00798 701/41 |
| 2016/0189396 | A1 * | 6/2016 | Kwong | G06K 9/4652 345/582 |
| 2016/0253788 | A1 | 9/2016 | Lee | |
| 2017/0169567 | A1 * | 6/2017 | Chefd'hotel | G06K 9/00127 |
| 2019/0137266 | A1 * | 5/2019 | Chang | G06K 9/209 |
| 2019/0303715 | A1 * | 10/2019 | Jiang | G06N 3/0481 |
| 2019/0354772 | A1 * | 11/2019 | Tasli | G06K 9/6215 |
| 2019/0377949 | A1 * | 12/2019 | Chen | G06K 9/00664 |
| 2019/0385024 | A1 * | 12/2019 | Croxford | G06N 3/0454 |
| 2020/0097775 | A1 * | 3/2020 | Zhu | H04L 25/03165 |

FOREIGN PATENT DOCUMENTS

| | | | |
|---|---|---|---|
| CN | 107665491 A | | 2/2018 |
| CN | 108062551 A | * | 5/2018 ............. G06N 5/003 |
| CN | 109376859 A | * | 2/2019 |
| CN | 110097012 A | * | 8/2019 |

OTHER PUBLICATIONS

Office action dated Jul. 26, 2021 for CN application No. 201811169586.9, dated Oct. 8, 2018, pp. 1-7.

* cited by examiner

5X5 Rhombus convolution filter

3X3 Rhombus convolution filter

FIG. 1

Dilated-rhombus convolution filter

IMAGE PROCESSING CIRCUIT AND ASSOCIATED IMAGE PROCESSING METHOD

BACKGROUND OF THE INVENTION

1. Field of the Invention

The present invention relates to image processing, and more particularly, to an image processing circuit with image identifying functions and an associated image processing method.

2. Description of the Prior Art

Convolution neutral networks can be seen in application of image processing circuits that employs deep learning methods. This type of neutral networks can be optimized by deriving an optimal model of the network model via acquiring a number of images and appropriate training. The image features are obtained by a determining circuit for identification and decision making purposes, and the convolution operation is a crucial step in capturing image features. The convolution filters used by recent convolution neutral networks are all square matrix convolution filters, such as 3*3 or 5*5 convolution filters. Although using square a convolution filter can be intuitive and convenient way of computations, distances from each pixel to the central pixel (L1 norm) are mostly different. For example, assume there are 8 pixels that are 2 pixels from the central pixel but only 4 of them use a 3*3 convolution filter, and thus within a certain length distance, some pixels will be performed with computations while the others will not. In this may, the computed pixels might cause imbalance on the weightings of the pixels of the input image, thereby raising the difficulty of capturing image characteristics.

SUMMARY OF THE INVENTION

Hence, an objective of the present invention is to provide an image processing circuit which uses a non-square convolution filter to perform computations, in order to solve problems encountered in in related art techniques.

An embodiment of the present invention discloses an image processing circuit which comprises a receiving circuit, a feature fetching module and a determining circuit. The receiving circuit is configured to receive image data. The feature fetching module is coupled to the receiving circuit, and is configured to at least use a first convolution filter to perform computations upon the image data or upon characteristic data generated by the image data, in order to generate a feature map, wherein the first convolution filter is a non-square convolution filter. The determining circuit is coupled to the feature fetching module, and is configured to identify the content of the image data according to the feature map.

Another embodiment of the present invention discloses an image processing method which comprises: receiving an image data; at least using a first convolution filter to perform computations upon the image data or upon characteristic data generated by the image data in order to generate a feature map, wherein the first convolution filter is a non-square convolution filter; and identifying the content of the image data according to the feature map.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram illustrating a rhombus convolution filter according to an embodiment of the present invention.

DETAILED DESCRIPTION

FIG. 1 is a diagram illustrating a rhombus convolution filter according to an embodiment of the present invention, wherein FIG. depicts a 3*3 rhombus convolution filter and a 5*5 rhombus convolution filter. Said 3*3 rhombus convolution filter comprises a central parameter $C0$, and four parameters $C11$, $C12$, $C13$ and $C14$ each being one pixel distant from the said central parameter $C0$. Said central parameter $C0$ and said four parameters $C11$, $C12$, $C13$ and $C14$ may be any possible real numbers, and no value is set for the remaining surrounding locations (i.e. the grids that surround the above-mentioned five parameters), or otherwise each of those surrounding grids may be given "0" as the parameter. Further, said 5*5 rhombus convolution filter comprises the central parameter $C0$, the four parameters $C11$, $C12$, $C13$ and $C14$ each being one pixel from said central parameter $C0$, and eight parameters $C21$, $C22$, $C23$, $C24$, $C25$, $C26$, $C27$ and $C28$ each being two pixels from said central parameter $C0$, wherein the aforementioned parameter may be any possible real number, and no value is set for the remaining surrounding locations (or those surrounding locations may be set with "0" as the parameter).

In the embodiment shown in FIG. 1, the rhombus convolution filter comprises all of the parameters $C11$, $C12$, $C13$ and $C14$ each being one pixel from the central parameter $C0$, and/or all of the parameters $C21$, $C22$, $C23$, $C24$, $C25$, $C26$, $C27$ and $C28$ each being two pixels from the central parameter $C0$. As can be seen from the above, the rhombus convolution filter has a balanced pixel spacing design, which can enhance the overall performance and the efficiency of image feature fetching.

It should be noted that the rhombus convolution filters shown in FIG. 1 are merely for illustrative purposes, and are not a limitation of the present invention. Modifications such as configuring the rhombus convolution filters to have all pixels spaced N pixels from the central parameter (wherein N is a positive integer larger than zero) shall fall within the scope of the present invention. In other words, if the rhombus convolution filter comprises a parameter that is spaced M pixels from the central parameter, it indicates that the rhombus convolution filter comprises all parameters being M pixels from the central parameter (wherein M is a positive integer).

Figure 2:
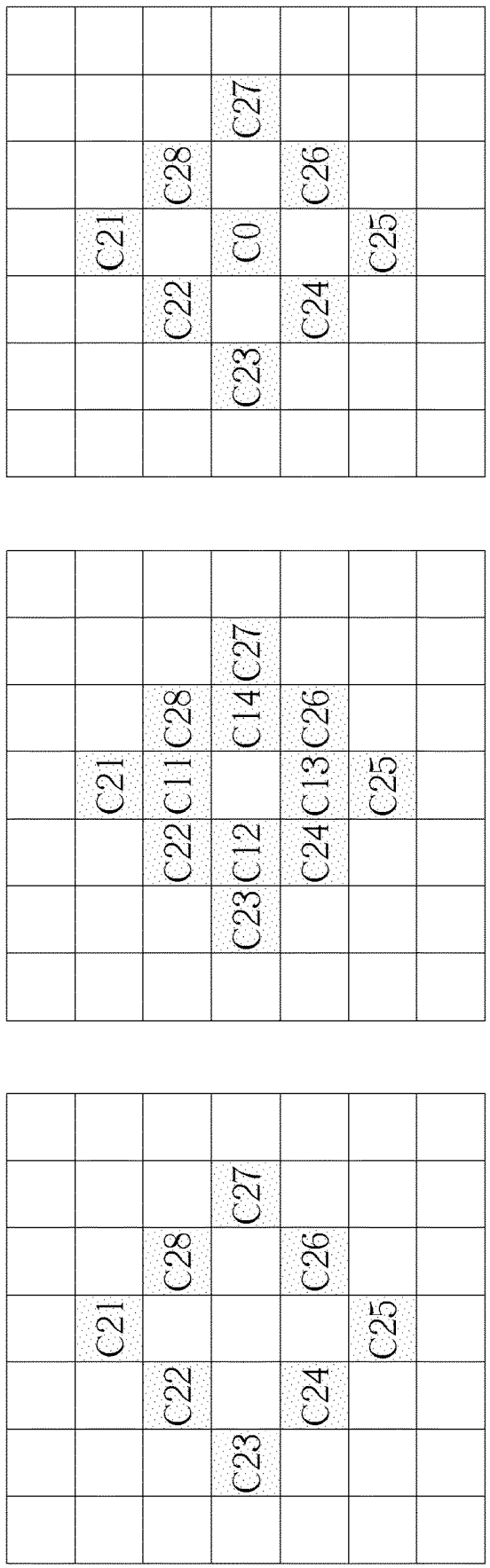
FIG. 2 is a diagram illustrating a dilated-rhombus convolution filter according to an embodiment of the present invention.

FIG. 2 is a diagram illustrating a dilated-rhombus convolution filter according to an embodiment of the present invention, wherein FIG. 2 depicts three exemplary different 5*5 dilated-rhombus convolution filters. Compared to the 5*5 rhombus convolution filter shown in FIG. 1, the dilated-rhombus convolution filter at the left of FIG. 2 (i.e. the first subfigure) only has eight parameters C21, C22, C23, C24, C25, C26, C27 and C28 each being two pixels from the central parameter C0, but excludes the central parameter C0 and the four parameters C11, C12, C13 and C14 each being one pixel from the central parameter C0. That is, no value (or only the parameter "0") will be set for the grids of the central parameter C0, the four parameters C11, C12, C13 and C14, and the rest locations that surround said eight parameters C21, C22, C23, C24, C25, C26, C27 and C28. The dilated-rhombus convolution filter shown in in the middle of FIG. 2 (i.e. the second subfigure) only comprises said four parameters C11, C12, C13 and C14 each being one pixel spaced from said central parameter C0, and eight parameters C21, C22, C23, C24, C25, C26, C27 and C28 each being two pixels spaced from said central parameter C0, with said central parameter C0 being excluded. That is, no value (or only the parameter "0") is set for said central parameter C0 and the remaining surrounding locations. In addition, the dilated-rhombus convolution filter at right of FIG. 2 (i.e. the third subfigure) only comprises said central parameter C0 and eight parameters C21, C22, C23, C24, C25, C26, C27 and C28 each being two pixels spaced from said central parameter C0, with the parameters C11, C12, C13 and C14 being excluded. That is, no value (or only the parameter "0") is set for the parameters C11, C12, C13 and C14 as well as the remaining surrounding locations.

Figure 3:
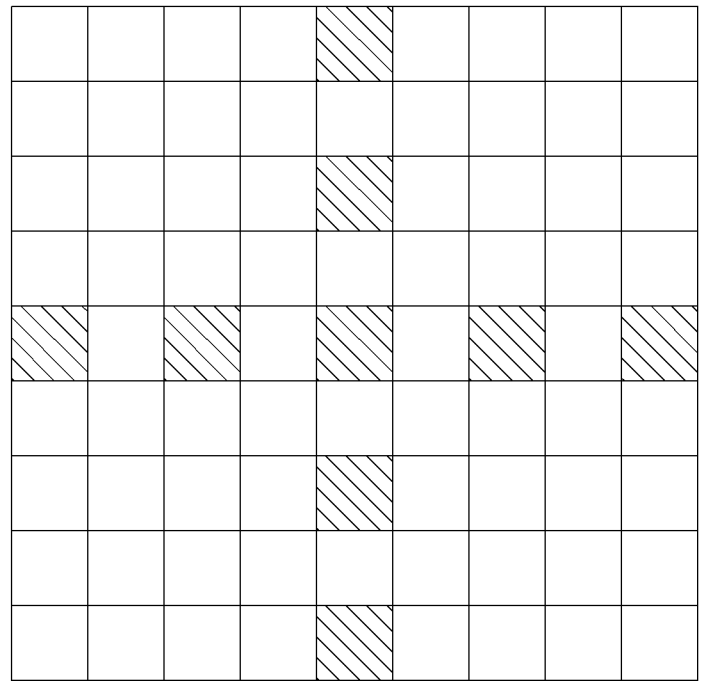
FIG. 3 is a diagram illustrating a cross convolution filter and a dilated-cross convolution filter according to an embodiment of the present invention.
Figure 3:
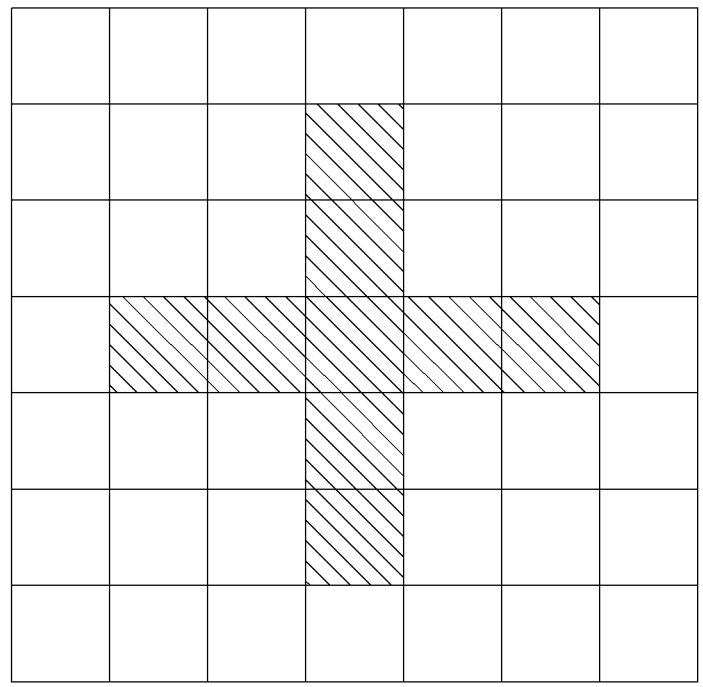

FIG. 3 is a diagram illustrating a cross convolution filter and a dilated-cross convolution filter according to an embodiment of the present invention. As shown in FIG. 3, real number parameters only exist in the pixel locations (i.e. grids) in the shaded region, and no value (or only the parameter "0") is set for the remaining blank region. In this embodiment, as long as the image feature is more obvious in the vertical or horizontal direction, the efficiency of the image feature fetching can be improved via the cross convolution filter and/or the dilated-cross convolution filter provided in this embodiment.

Figure 4:
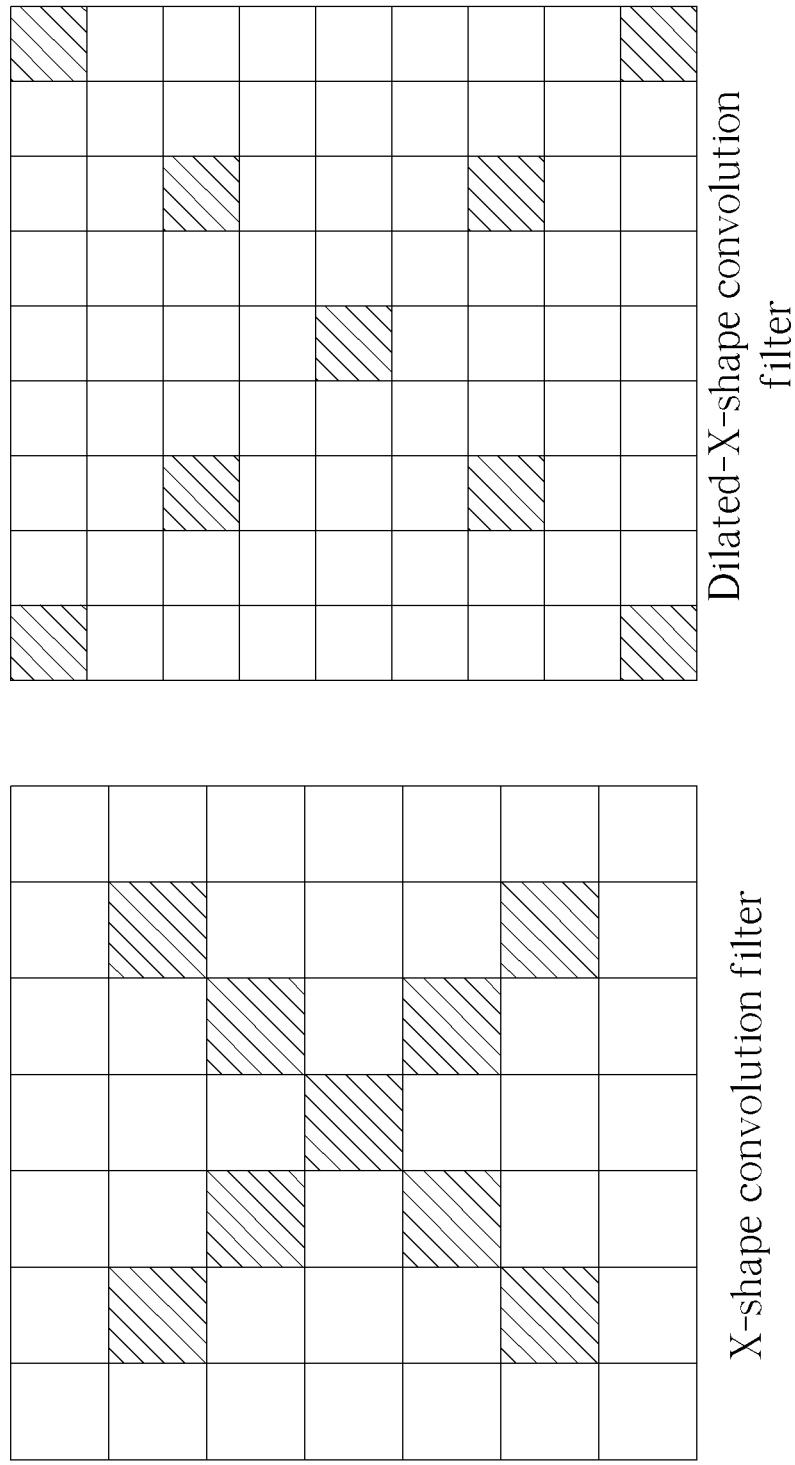
FIG. 4 is a diagram illustrating an X-shape convolution filter and a dilated-X-shape convolution filter according to an embodiment of the present invention.

FIG. 4 is a diagram illustrating an X-shape convolution filter and a dilated-X-shape convolution filter according to an embodiment of the present invention. As shown in FIG. 4, only the grids (pixel locations) with the shaded pattern have real number parameters, and the remaining blank region does not has any value or (only has the parameter "0"). In this embodiment, if the image feature is more obvious along the 45 degree direction, the efficiency of image feature fetching can be raised via the X-shape convolution filter and/or the dilated-X-shape convolution filter of this embodiment.

Figure 5:
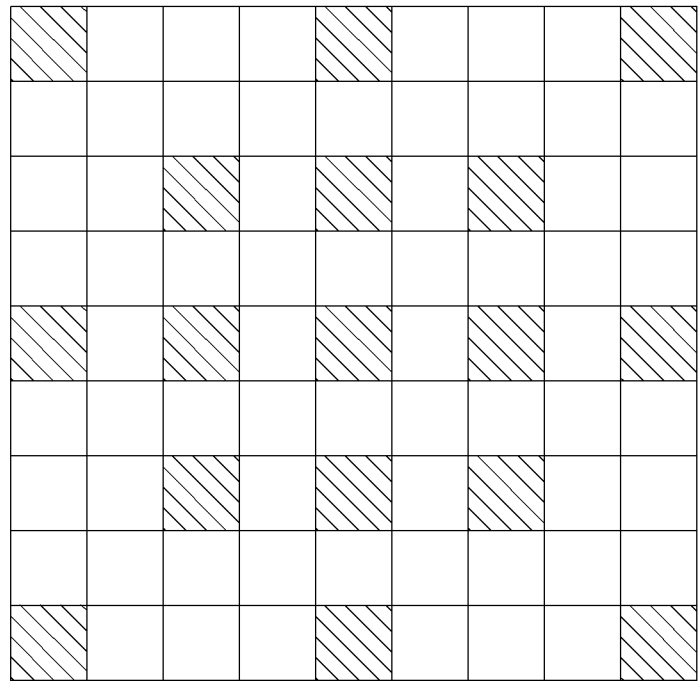
FIG. 5 is a diagram illustrating a star convolution filter and a dilated-star convolution filter according to an embodiment of the present invention.
Figure 5:
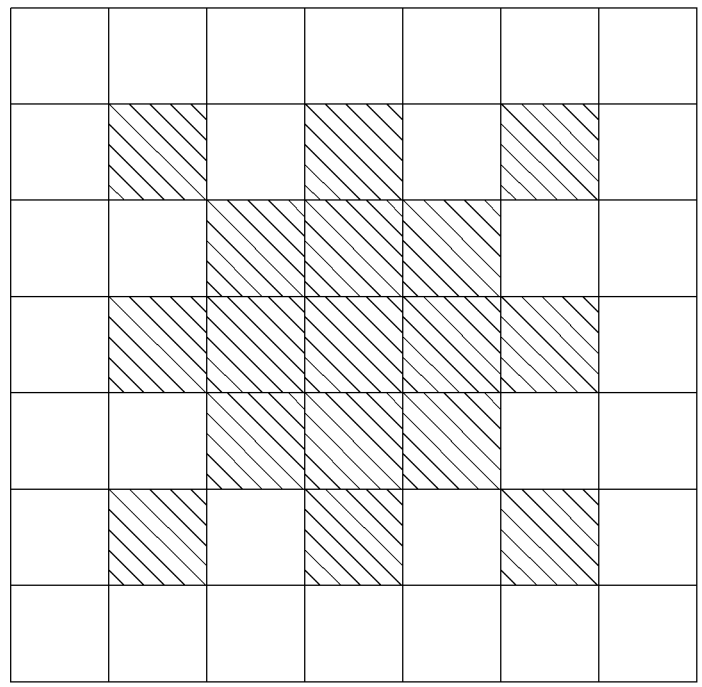

FIG. 5 is a diagram illustrating a star convolution filter and a dilated-star convolution filter according to an embodiment of the present invention. As shown in FIG. 5, only the grids (pixel locations) with the shaded pattern have real number parameters, and the remaining blank region is not assigned any value (or only assigned the parameter "0"). In this embodiment, if the image feature is more obvious along the vertical, horizontal and/or 45 degree direction, the efficiency of the image feature fetching can be raised by the star convolution filter and dilated-star convolution filter of this embodiment.

It should be noted that the embodiments shown in FIGS. 2-5 are merely for illustrative purposes, and are not a limitation of the present invention. After reading this embodiment, one skilled in the art should be readily to know that the dilated-rhombus convolution filter, cross convolution filter, dilated-cross convolution filter, X-shape convolution filter, dilated-X-shape convolution filter, star convolution filter and dilated-star convolution filter may be configured in other sizes, such as 7*7, 9*9, etc.

Figure 6:
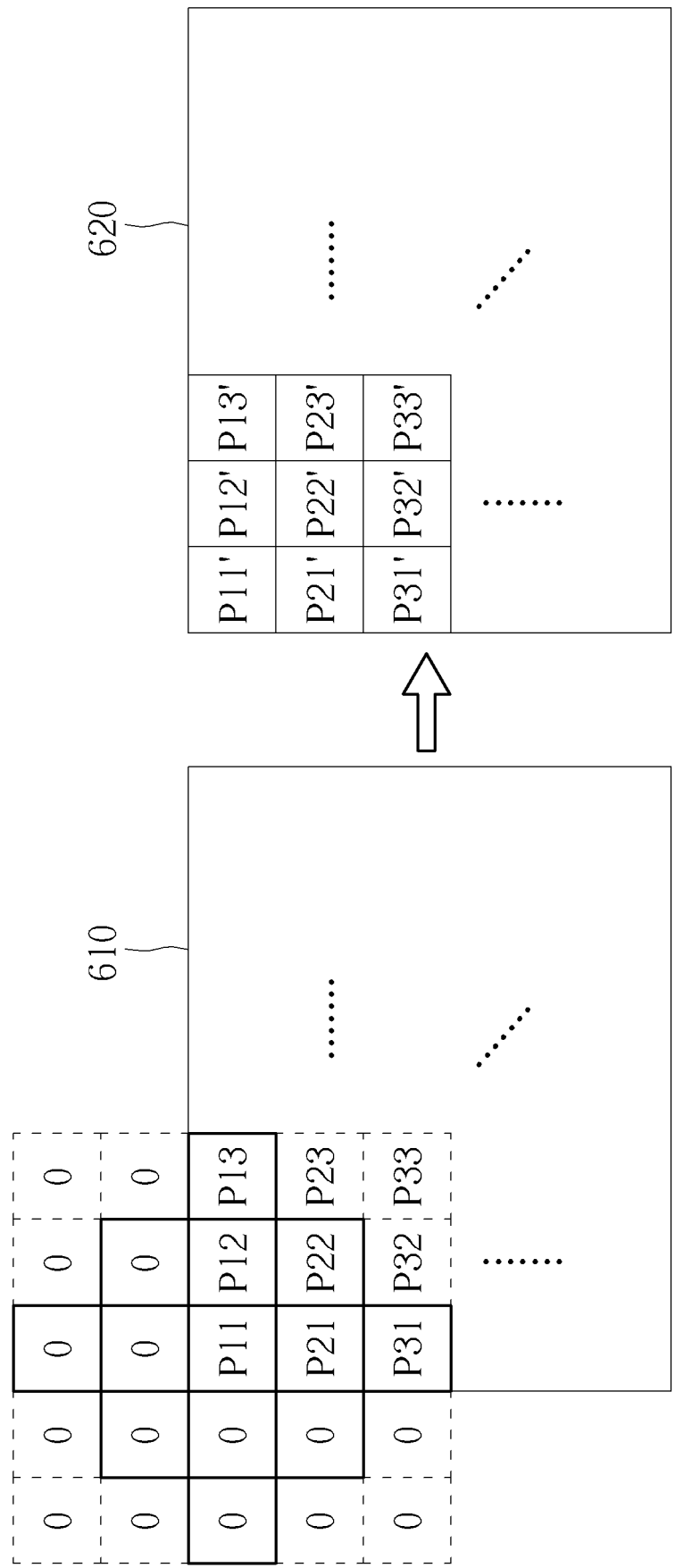
FIG. 6 is a diagram illustrating using the convolution filter of the present invention to perform convolution operations on image data.

FIG. 6 is a diagram illustrating using the convolution filter of the present invention to perform convolution operations on image data 610. As shown in FIG. 6, assume that the image data 610 comprises multiple pixels, when performing convolution operation on each pixel, the pixels will be aligned with the central parameter of the convolution filter, and then perform a weighted summation upon the pixels values within the range of the convolution filter and its corresponding convolution filter parameters, in order to obtain a processed pixel value. For example, take the 5*5 rhombus convolution filter and the pixel P11 as example shown in FIG. 1, the corresponding processed pixel value P11' may be calculated by the following equation:

$$P11'=P11*C0+P12*C14+P13*C27+P21*C13+P22*C26+P31*C25$$

Since the pixel P11 is located at the edge of the image, the convolution operation will perform zero padding on the surrounding of the image data 610, and some parameters such as C21, C11, C22, C23 and C12 of the 5*5 rhombus convolution filter will not appear in the aforementioned equation because their corresponding pixel value is zero. Based on the same method, all pixels in the image data 610 will be performed with the aforementioned weighted summation operation by using the convolution filter, to respectively obtain the corresponding processed pixel values P12', P13', etc., in order to obtain a feature map 620.

It should be noted that the image data 610 shown in FIG. 6 may be a feature map obtained by the image data. That is, the convolution operation may further acquire features from a feature map.

Figure 7:
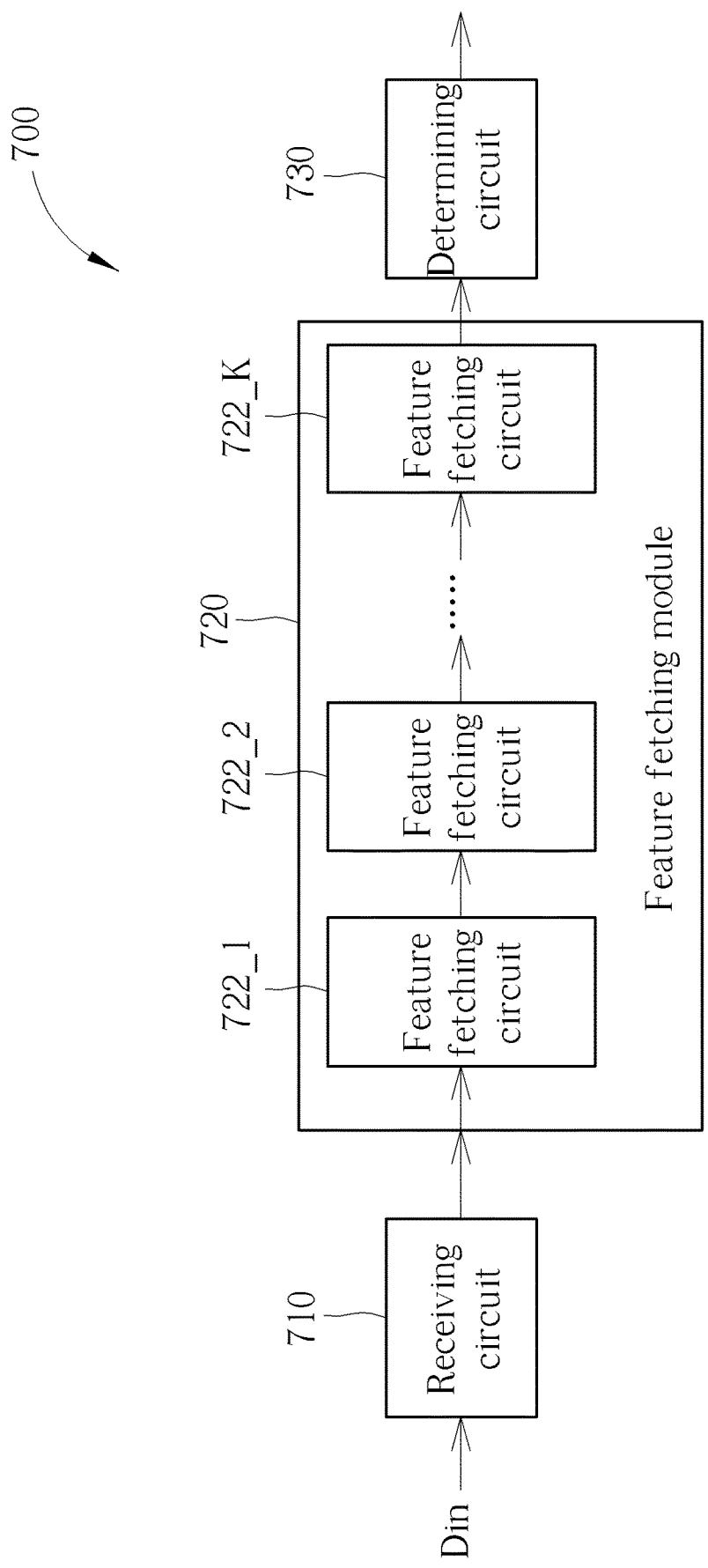
FIG. 7 is a diagram illustrating an image processing circuit according to an embodiment of the present invention.

FIG. 7 is a diagram illustrating an image processing circuit 700 according to an embodiment of the present invention. As shown in FIG. 7, the image processing circuit 700 comprises a receiving circuit 710, a feature fetching module 720 and a determining circuit 730, wherein the feature fetching module 720 may comprise multiple feature fetching circuits 722_1-722_K. In this embodiment, the image processing circuit 700 is applicable to a surveillance system, and the image processing circuit 700 receives the image data Din from a surveillance device and performs image identification accordingly in order to determine the content of the image data Din, such as determining whether there is an image of one or more human beings in the image data Din.

During the operation of image processing circuit 700, the receiving circuit 710 receives the image data Din, and performs some front end processing on the image data and then sends the processed image data to the feature fetching module 720. Next, the feature fetching circuit 722_1 in the feature fetching module 720 uses one or multiple convolution filters to perform feature fetching on the image data Din in order to generate at least one feature map. After that, the feature fetching circuits 722_2-722_K uses one or multiple convolution filters to sequentially perform feature fetching upon the feature map generated by a previous stage in order to generate another feature map. Please refer to FIG. 8, which is a diagram illustrating feature maps respectively generated by multiple image processing circuits. Assume the image data Din has **46*46 pixels and each pixel has red, green and blue pixel values, the feature fetching circuit 722_1 may use the multiple convolution filter to perform convolution operations (e.g. the feature fetching operation) upon the image data Din for 32 times. Under the situation where the surrounding of the image data Din performed with zero padding, 32 40*40 feature maps may be generated. In this embodiment, the convolution filter used by the feature fetching circuit 722_1** may be a 7*7 convolution filter, and said 7*7 convolution filter may be generated according to any non-square convolution filter shown in FIGS. 1-5, and/or generated by a conventional square convolution filter. For example, the feature fetching circuit 722_1 may use a 7*7 rhombus convolution filter to perform feature fetching upon the image data Din in order to generate the first feature map. Next, the feature fetching circuit 722_1 goes on using a 7*7 square convolution filter to perform feature fetching upon the image data Din in order to generate the second feature map. Next, the feature fetching circuit 722_1 goes on using a 7*7 dilated-rhombus convolution filter to perform feature fetching upon the image data Din in order to generate the third feature map, and so on. Until the feature fetching circuit 722_1 generates the 32nd feature map, this 32nd feature map will be used as the first layer output of the feature fetching module 720.

In the above embodiment, during the feature fetching circuit 722_1 generating feature maps, it adopts different convolution filters to perform computations in order to generate the feature maps, and then combines these feature maps as an output of a layer. In this way, since the feature fetching circuit 722_1 has multiple topological convolution filter modules, it may facilitate the diversity of using the convolution neutral network, and the operation of obtaining the image feature may be performed more efficiently in a parallel and simultaneous way.

Next, the feature fetching circuit 722_2 may perform down-sample each of the 40*40 feature maps outputted by the feature fetching circuit 722_1 into 20*20 feature maps. After that, the feature fetching circuit 722_2 further uses multiple 5*5 convolution filters to perform convolution operations upon the down-sampled feature maps for 64 times. Under the situation where the surrounding of the down-sampled feature maps is not performed with zero padding, 64 16*16 feature maps may be generated, wherein these 64 feature maps may be used as the second layer output of the feature fetching module 720, and the convolution filter used by the feature fetching circuit 722_2 may comprise the non-square convolution filter shown in any of the embodiments of FIGS. 1-5, and/or a conventional square convolution filter. Next, the feature fetching circuit 722_3 may perform down-sample each of the 16*16 feature maps outputted by the feature fetching circuit 722_2 8*8 feature maps. Next, the feature fetching circuit 722_3 further uses multiple 3*3 convolution filters to perform convolution operation upon down-sampled feature maps for 128 times. Under the situation where the surrounding of the down-sampled feature maps is not performed with zero padding, 128 6*6 feature maps may be generated, wherein these 128 feature maps may be used as the third layer output of the feature fetching module 720, and the convolution filter used by the feature fetching circuit 722_3 may comprise any non-square convolution filter shown in the embodiments of FIGS. 1-5, and/or a conventional square convolution filter. Finally, the feature fetching circuit 722_4 uses multiple 3*3 convolution filters to perform convolution operation upon the feature maps outputted by the feature fetching circuit 722_3 for 128 times. Under the situation where the surrounding of the feature maps is not performed with zero padding, 128 4*4 feature maps may be generated, wherein these 128 4*4 feature maps may be used as the fourth layer output of the feature fetching module 720, and the convolution filter used by the feature fetching circuit 722_4 may comprise any non-square convolution filter shown in the embodiments of FIGS. 1-5, and/or a conventional square convolution filter.

Figure 8:
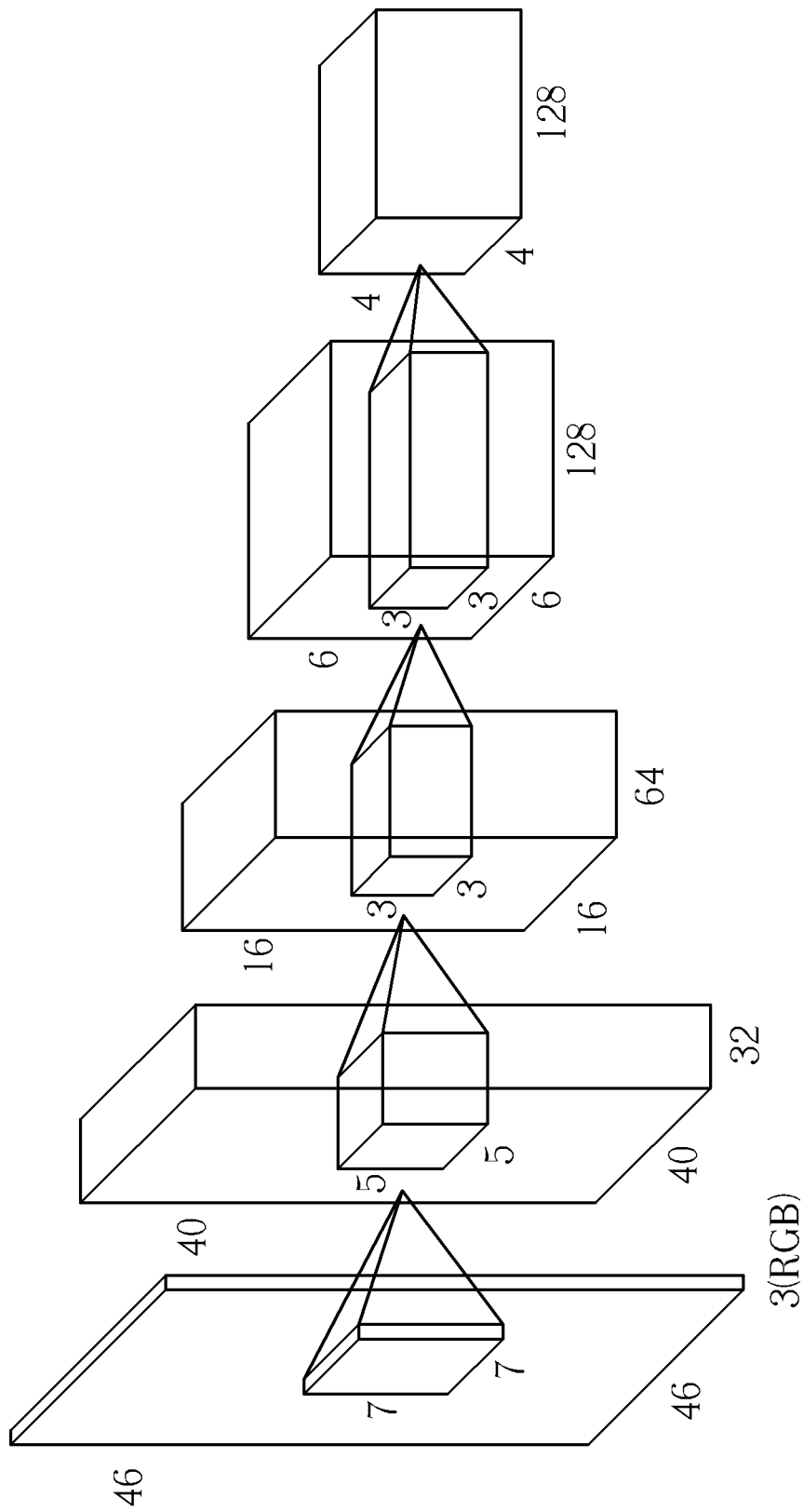
FIG. 8 is a diagram illustrating feature maps respectively generated by multiple image processing circuits.

It should be noted that the embodiment of FIG. 8 is only for illustrative purposes, and is not a limitation of the present invention. In other embodiments of the present invention, the size of the image data Din and the size of each feature map may be modified according to actual design concerns, and the exact number of the feature fetching circuits 722_1-722_K and the exact number of layers of the feature fetching module 720 may be adjusted by the designer according to the design concerns. As long as any of the feature fetching circuit 722_1-722_K employs the non-square convolution filter described in the present invention when perform feature fetching operations, this kind of modification shall fall within the scope of the present invention.

Lastly, the determining circuit 730 may refer to the last layer output of the feature fetching module 720 to perform associated computations in order to identify the content of the image data Din.

Figure 9:
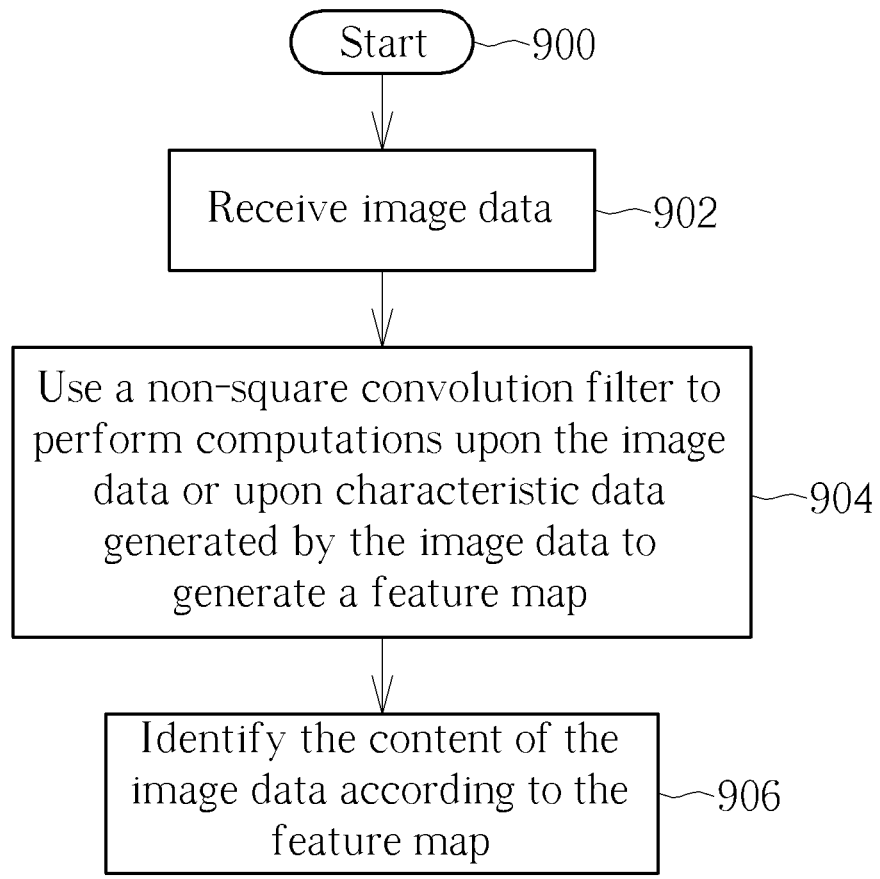
FIG. 9 is a flowchart illustrating an image processing method according to an embodiment of the present invention.

FIG. 9 is a flowchart illustrating an image processing method according to an embodiment of the present invention. The image processing method can be referred to the above-illustrated embodiments, and may be briefed as follows.

Step 900: Start.

Step 902: Receive image data.

Step 904: Use a non-square convolution filter to perform computations upon the image data or upon characteristic data generated by the image data in order to generate a feature map.

Step 906: Identify the content of the image data according to the feature map.

To summarize the present invention, in the image processing circuit and the image processing method of the present invention, a non-square convolution filter is utilized to obtain images in order to raise the efficiency of image feature fetching under particular circumstances. Further, in a deep learning image identifying system, the non-square convolution filter of the present invention may be jointly operated with other types of convolution filters in order to make the feature fetching module have a multi-topological-convolutional module, which may facilities the diversity of using the convolution neutral network, and the operation of obtaining the image feature may be performed more efficiently in a parallel and simultaneous way.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, comprising:
a receiving circuit, configured to receive image data;
a feature fetching module, coupled to the receiving circuit, the feature fetching module configured to at least use a first convolution filter to perform computations upon the image data or upon characteristic data generated by the image data, in order to generate a feature map, wherein the first convolution filter is a non-square convolution filter; and
a determining circuit, coupled to the feature fetching module, the determining circuit configured to identify the content of the image data according to the feature map;
wherein a size of the first convolution filter is a square of size K*K, K is an odd number equal to or greater than five; and parameters having valid non-zero values within the first convolution filter form a rhombus that is different from the square, wherein parameters corresponding to corners of the first convolution filter are zero;
wherein the first convolution filter has a center parameter corresponding to a center of the square, all the parameters that are N pixel distances from the central parameter of the first convolution filter have the valid non-zero values, and N comprises a positive integer equal to or larger than two; and
when N is equal to two, there are eight parameters that are N pixel distances from the central parameter of the first convolution filter;
wherein the center parameter is zero.

2. The image processing circuit of claim 1, wherein the feature fetching module further uses a second convolution filter to perform computations upon the image data or upon the characteristic data generated by the image data, in order to generate another feature map, wherein the second convolution filter is a square convolution filter.

3. An image processing method, comprising:
receiving an image data;
at least using a first convolution filter to perform computations upon the image data or upon characteristic data generated by the image data in order to generate a feature map, wherein the first convolution filter is a non-square convolution filter; and
identifying the content of the image data according to the feature map;
wherein a size of the first convolution filter is a square of size K*K, K is an odd number equal to or greater than five; and parameters having valid non-zero values within the first convolution filter form a rhombus that is different from the square, wherein parameters corresponding to corners of the first convolution filter are zero;
wherein the first convolution filter has a center parameter corresponding to a center of the square, all the parameters that are N pixel distances from the central parameter of the first convolution filter have the valid non-zero values, and N comprises a positive integer equal to or larger than two; and
when the N is equal to two, there are eight parameters that are N pixel distances from the central parameter of the first convolution filter;
wherein the center parameter is zero.

4. The image processing circuit of claim 1, wherein all the parameters that are one pixel distance from the central parameter of the first convolution filter are zero.

5. The image processing method of claim 3, wherein all the parameters that are one pixel distance from the central parameter of the first convolution filter are zero.

* * * * *